United States Patent
Schmidt et al.

(10) Patent No.: US 8,392,455 B2
(45) Date of Patent: Mar. 5, 2013

(54) MULTI-INTERVAL HEURISTICS FOR ACCELERATING TARGET-VALUE SEARCH

(75) Inventors: Tim Schmidt, Palo Alto, CA (US); Lukas D. Kuhn, Palo Alto, CA (US); Rong Zhou, Cupertino, CA (US); Johan de Kleer, Los Altos, CA (US); Robert Price, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 547 days.

(21) Appl. No.: 12/497,353

(22) Filed: Jul. 2, 2009

(65) Prior Publication Data
US 2011/0004625 A1 Jan. 6, 2011

(51) Int. Cl.
*G06F 7/00* (2006.01)
(52) U.S. Cl. ........ 707/776; 707/705; 707/758; 707/798; 706/47; 706/55
(58) Field of Classification Search .......... 707/999.006, 707/705, 758, 776, 798; 706/47, 55
See application file for complete search history.

(56) References Cited

U.S. PATENT DOCUMENTS

| | | | | |
|---|---|---|---|---|
| 7,349,838 | B2 * | 3/2008 | Summers | 703/22 |
| 2006/0106757 | A1 * | 5/2006 | Sakai et al. | 707/2 |
| 2006/0167865 | A1 * | 7/2006 | Andrei | 707/4 |
| 2009/0024586 | A1 * | 1/2009 | Zhou | 707/3 |
| 2009/0216583 | A1 * | 8/2009 | Degbotse et al. | 705/7 |
| 2010/0010654 | A1 | 1/2010 | DeKleer et al. | |
| 2010/0010845 | A1 | 1/2010 | Kuhn et al. | |
| 2010/0010952 | A1 | 1/2010 | Kuhn et al. | |
| 2010/0241251 | A1 | 9/2010 | Kuhn et al. | |
| 2011/0004581 | A1 | 1/2011 | Schmidt et al. | |

OTHER PUBLICATIONS

Culberson et al., "Pattern Databases", Computational Intelligence, 14(3): pp. 318-334, 1998.*
Kuhn et al., "Heuristic Search for Target Value Path Problem", The First Int'l Symposium on Search Techniques in Artificial Intelligence and Robotics, Jul. 13-14, 2008, pp. 1-7.
Ramalingham and Reps: An Incremental Algorithm for a Generalization of the Shortest-Path Problem, Journal of Algorithms, Feb. 1996, pp. 1-31.
Kuhn et al., "Pervasive Diagnosis: The Integration of Diagnostic Goals into Production Plans", 23rd AAAI Conference on Artificial Intelligence (AAAI-08) / 20th Conference on Innovative Applications of Artificial Intelligence, Jul. 13-17, 2008, pp. 1306-1312.

* cited by examiner

*Primary Examiner* — Shew-Fen Lin
*Assistant Examiner* — Jieying Tang
(74) *Attorney, Agent, or Firm* — Fay Sharpe LLP (57) ABSTRACT

Methods and systems for solving a target value search problem using a multi-interval heuristic are presented. The methods and system identity a path, or paths, in a graph, whereby a connection graph is created and range sets are generated for each vertex in the connection graph. Range sets include one or more intervals. Thereafter, a best search is performed to identify a path, or paths, from a starting vertex to a goal vertex having a path value closest to a target value.

14 Claims, 9 Drawing Sheets

| TARGET-VALUE | 4 INTERVALS | 2 INTERVALS | 1 INTERVAL | UNGUIDED |
|---|---|---|---|---|
| 1.08 | 14.5 | 11.7 | 11.8 | 20333.0 |
| 1.18 | 11.8 | 12.9 | 13.2 | 20333.0 |
| 1.28 | 14.4 | 12.1 | 13.0 | 20333.0 |
| 1.46 | 70.0 | 76.0 | 78.0 | 20333.0 |
| 1.64 | 88.0 | 101.0 | 133.0 | 20333.0 |
| 1.82 | 128.0 | 175.0 | 300.0 | 20333.0 |
| 2.00 | 235.0 | 295.0 | 504.0 | 20333.0 |
| 2.18 | 282.0 | 467.0 | 837.0 | 20333.0 |
| 2.37 | 428.0 | 650.0 | 1240.0 | 20333.0 |
| 2.55 | 373.0 | 845.0 | 1671.0 | 20333.0 |
| 2.73 | 576.0 | 1021.0 | 2091.0 | 20333.0 |
| 2.91 | 394.0 | 1179.0 | 2440.0 | 20333.0 |
| 3.09 | 635.0 | 1279.0 | 2746.0 | 20333.0 |
| 3.28 | 331.0 | 1253.0 | 2728.0 | 20333.0 |
| 3.46 | 521.6 | 1162.4 | 2710.0 | 20333.0 |
| 3.64 | 248.6 | 1103.1 | 2484.1 | 20333.0 |
| 3.82 | 425.0 | 934.0 | 2174.0 | 20333.0 |
| 4.00 | 169.8 | 784.0 | 1852.0 | 20333.0 |
| 4.19 | 228.0 | 559.0 | 1374.0 | 20333.0 |
| 4.37 | 92.0 | 472.0 | 1179.0 | 20333.0 |
| 4.55 | 112.1 | 266.0 | 718.0 | 20333.0 |
| 4.73 | 34.0 | 224.0 | 586.0 | 20333.0 |
| 4.91 | 39.8 | 119.1 | 267.0 | 20333.0 |
| 5.09 | 36.0 | 92.0 | 233.0 | 20333.0 |
| 5.28 | 12.3 | 36.6 | 83.0 | 20333.0 |
| 5.46 | 10.0 | 39.0 | 73.0 | 20333.0 |
| 5.64 | 13.8 | 13.8 | 17.5 | 20333.0 |
| 5.82 | 9.0 | 9.0 | 9.0 | 20333.0 |
| 5.92 | 9.0 | 9.0 | 9.0 | 20333.0 |
| 6.02 | 9.0 | 9.0 | 9.0 | 20333.0 |

MULTI-INTERVAL HEURISTICS FOR ACCELERATING TARGET-VALUE SEARCH

BACKGROUND

The present exemplary embodiments relate to systems and methods for target value searching that can be used in a variety of settings such as online diagnosis for production planning systems and systems for providing consumers with targeted search results. Automated production planning systems may require selection of plant resources to produce a given product while intelligently employing certain production resources to obtain diagnostic information indicating the probability of particular resources being faulty. In this situation, the diagnostic goals of the planner may not be facilitated by simply selecting the shortest or fastest set of resources to build the product, but instead selecting a plan defining a sequence of resources that build the product while testing fault probabilities that are non-zero. In another example, consumers may desire a planner to identify vacation plans to a certain destination (or multiple prospective destinations) that have a certain duration (or range of durations, such as 5-7 days with start and end dates in a specified month) and that have a given target cost or cost range. Mapping systems may be required in a further application that can receive starting and ending locations, as well as a target distance and/or time values for planning a drive for viewing autumn leaves where the consumer wants a trip plan that lasts for 3-5 hours during daylight through parks in the month of October.

In the past, search problems were solved using minimization algorithms to find the shortest path or paths between a starting state and a goal state. However, the goal in certain applications is not necessarily to find paths with minimum length or cost, but instead the desired path has a non-zero or non-minimal cost or duration. Using shortest-path searching techniques in these situations involves identifying the shortest paths, and eliminating or exonerating those identified paths that do not fall within a target value range. The process would then be repeated until paths are identified that are within the desired range. This approach is impractical in most real-life applications, whereby a need exists for efficient target value path searching techniques and systems for use in identifying one or more paths having a value closest to a given target value.

INCORPORATION BY REFERENCE

The disclosures of U.S. patent application Ser. No. 12/497,326 (Publication No. 2011-0004581-A1) for "Depth-First Search for Target Value Problems," by Schmidt et al., filed Jul. 2, 2009; and U.S. patent application Ser. No. 12/409,235 (Publication No. 2010-0010952-A1) for "Heuristic Search for Target-Value Path Problem," by Kuhn et al., filed Mar. 23, 2009, are each hereby incorporated herein in their entireties.

BRIEF DESCRIPTION

In accordance with one aspect of the present invention, a method for generating a pattern database for a model-based control system is provided. The model-based control system includes a directed acyclic graph. The directed acyclic graph includes a plurality of vertices interconnected by a plurality of edges. Each of the plurality of vertices includes a range set. The method includes the step of propagating the range sets of each of the plurality of vertices in a bottom-up order. Each of the propagated range sets is propagated from a source vertex to an immediate ancestor over an edge. The range set of at least one of the plurality of vertices includes a plurality of intervals. The method further includes adding the each of the propagated range sets to the range set of the immediate ancestor corresponding to the each of the propagated range sets.

In accordance with another aspect of the present invention, a method for determining a target path for a model-based control system which employs target value searching is provided. The model-based control system includes a directed acyclic graph, where the directed acyclic graph includes a plurality of vertices interconnected by a plurality of edges. The method includes the step of performing a heuristic based target value search of the directed acyclic graph for the target path. The heuristic based target value search uses a multi-interval heuristic to prune search space.

In accordance with another aspect of the present invention, a model-based control system for controlling a production system is provided. The production system provides jobs and objectives to the model-based control system. The production system includes a plant. The system includes a planner operative to provide the production system with a plan. The planner generates the plan using a heuristic based target value search. The heuristic based target value search uses a multi interval heuristic. The heuristic based target value search generates the plan with a failure probability most closely approximating a target value. The system further includes a system model operative to model the behavior of the plant. The system further includes a diagnosis engine operative to estimate failure probabilities for plans and provide diagnostic guidance to the planner.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

In a target value path problem, one is interested in finding a path between two nodes, or vertices, in a graph, whose sum of edge weights, or values, is as close as possible to some target-value. Such problems arise in a variety of domains, such as scheduling interdependent tasks for an employee's given working-hours, planning a bicycle trip with a given duration or determining an appropriate nightly-build process.

Figure 1:
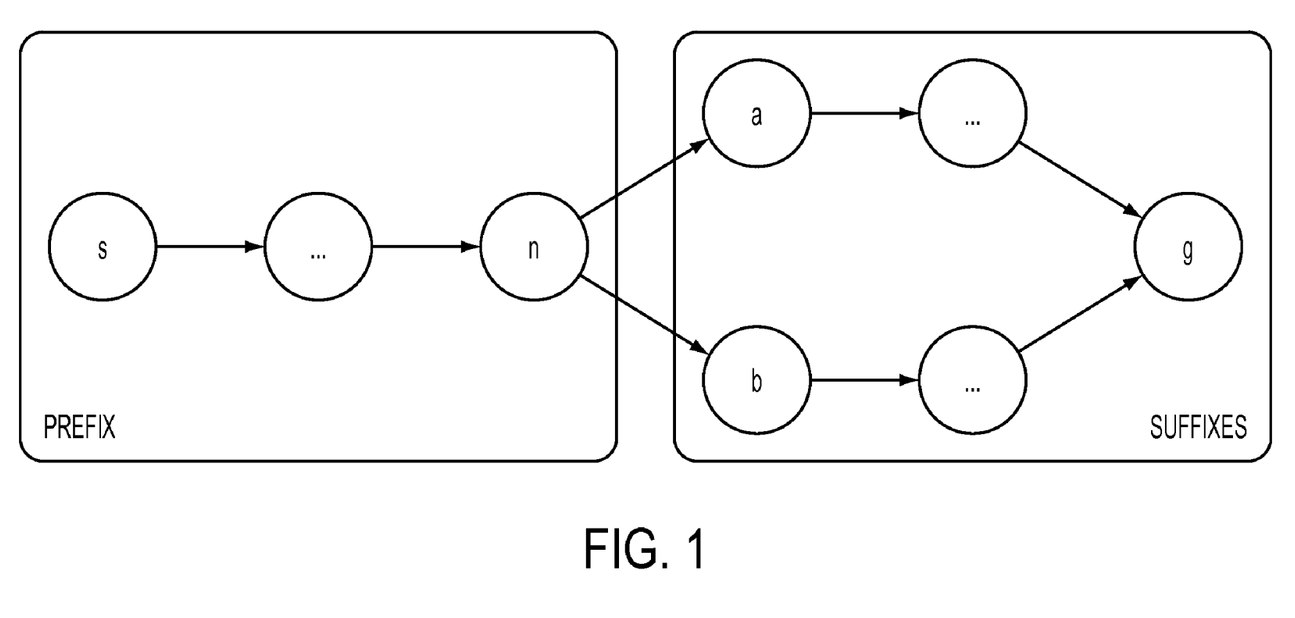
FIG. 1 is a graph illustrating a prefix and corresponding suffixes.

Given a directed acyclic graph G=(V, E) with edge values, a target-value path between two vertices $v_o$, $v_g \in V$ with target-value tv is some path between $v_o$ and $v_g$, whose value is closest to tv. The value g(p) of a path p is defined as the sum of its edge values. If $P_{v_o,v_g}$ is the set of all paths between $v_o$ and $v_g$, then $P_{v_o,v_g}^{tv}=\text{armin}_{|tv-g(p)|}P_{v_o,v_g}$ is defined as the set of paths between $v_o$ and $v_g$ with minimal deviation from tv as the target-value path set with respect to $v_0$, $v_g$, tv. In the following, target-value search (or tvs for short) refers to a mapping of tuples ($v_0$, $v_g$, tv) to some element of $P_{v_o,v_g}^{tv}$.

tvs was introduced in Kuhn et al., *Heuristic Search for Target-Value Path Problem*, First International Symposium on Search Techniques in Artificial Intelligence and Robotics (Jul. 13-14, 2008), which is incorporated herein in its entirety. tvs is a challenging problem because generally it does not exhibit the properties of both overlapping subproblems and optimal substructure that would make it amenable to a dynamic programming approach (as is typically leveraged for shortest-path problems). In *Heuristic Search for Target-Value Path Problem*, Kuhn et al. showed that, in many cases, the problem can be decomposed, so that parts of it exhibit said properties. The idea is to pre-compute a pattern database pd that contains ranges (or intervals) of vertices' different path lengths to $v_g$. A path from some vertex in v to $v_g$ is called a suffix s (See FIG. 1). An interval corresponds to the representation of a range. Thus, the pattern database pd contains ranges (or intervals) of suffix lengths. Thereafter, given some prefix p (some path from $v_o$ to some vertex in G) and tv, the pd can be used to determine whether the optimal completion tv−g(p) falls outside the ranges stored in the pd. If so, the problem of finding an optimal completion for p breaks down to either a shortest-path or longest-path problem, both of which can be solved using dynamic programming (in DAGs).

First, in a dynamic programming sweep, each vertex in the Connection Graph of $v_o$ and $v_g$ (that is the subgraph of C comprising of only the vertices that are both $v_o$'s descendants and $v_g$'s ancestors, including $v_o$, $v_g$) is annotated with a range encompassing the values of the paths from this vertex to $v_g$. The range of a vertex v represents a progressive approximation of the lengths of paths from the vertex v to $v_g$ (i.e., all path lengths are guaranteed to be within the range). This pd can be reused for any tvs between $v_o$ and $v_g$.

Generation of the pd generally begins by initializing pd($v_g$) =[0,0] and setting up a queue comprising of just $v_g$. In each step, a vertex is removed from the queue. Then for each in-edge e, the range is shifted by value(e) and propagated over e to the respective predecessor. Upon receiving the range, the predecessor combines its range with the received range. If the predecessor's range changes, it is added to the queue. The process is repeated until a steady state is reached (i.e., when the queue is empty).

Alternatively, generation of the pd may begin by initializing pd($v_g$)=[0, 0] and setting up a queue comprising of just $v_g$. Additionally, initialization encompasses setting successor counters for each vertex. Successor counters correspond to the number of successors a vertex has. In each step, a vertex is removed from the queue. Then for each out-edge e, the range of the corresponding successor is shifted by value(e) and propagated over e to the vertex. Upon receiving the shifted range from each successor, the vertex combines the shifted ranges. Further, the successor counters of each predecessor of the vertex are decremented. If a successor counter of a predecessor is zero, the predecessor is added to the queue. The process is repeated until a steady state is reached (i.e., when the queue is empty).

Notwithstanding how the pattern database pd is generated, a variant of A* is thereafter initiated from $v_o$, wherein a search node consists of a prefix (represented as a vertex and a pointer to its ancestor node) and its target-value to-to (from here on referred to as tv'), which is the original tv minus the prefix's value (g(P)). Alternatively, a depth-first based approach may be used. Based on tv', and the pd entry for the prefix's last vertex, a minimum deviation for the best completion of that prefix can be computed, which is represented by the following heuristic:

$$\text{heur}(p)=\min_{r \in pd(plast)}(\text{dist}(r,g(p)-tv))$$

dist is defined as 0 if the scalar is within the range; otherwise as min(|r.lb−tv'|, |r.ub−tv'|). The heur function has the following properties: it represents a lower bound on the value of the objective function for the best (and thus for all) possible completion of p in G; and, for all prefixes p' $\in P_{v_o,v_g}$, heur(p', tv')=dist([0;0],tv')=|tv'|=|tv−g(p)| equals the objective function. This allows the use heur as the f function in an A*.

The heuristic uses the pattern database by comparing a prefix's tv' against its last vertex's range. Should tv' lie inside the range, there is a chance that an optimal completion of the prefix yields precisely the original tv. Thus, in order to be admissible, the heuristic has to rank such prefixes highest and return 0; otherwise, the heuristic returns tv' distance to the closest range. As all possible completion lengths lie within the range and the range's bounds represent actual path lengths, this is the closest any completion of said prefix can come to the original target value. So, in essence, the heuristic either gives perfect guidance (heur>0) or no guidance at all (heur=0). Accordingly, to guarantee optimality, all prefixes in the heuristic's "blind-spot" (i.e., those ending in vertices where heur=0) have to be processed. Intuitively, assuming tvs uniformly distributed over the range of the graph's path lengths, the probability of the former case is inversely proportional to the "area" covered by the ranges. In a DAG, this area increases monotonically in the link-distance from the goal node, as each vertex's range-set covers at least as much ground as each of its successors.

In the context of tvs there are two ways in which prefixes can be redundant. First, any pair of prefixes ending in the same vertex, with equal tv', will share the same optimal completion and have equal deviation from the original target-value. In other words, the respective best solutions stemming from said pair will be equal with regards to tvs's objective function and one of the prefixes can therefore be considered redundant and be discarded. This is tvs' analogue to duplicate detection. The second aspect is much more general: since heur has the property that for any prefix p, with heur(p,tv')>0, heur(p,tv') represents the actual deviation of p's best completion from the original tv. As such, for any pair of nodes ($p_1$,tv'$_1$), ($p_2$,tv'$_2$) with heur($p_1$,tv'$_1$)≧heur($p_2$,tv'$_2$)>0, ($p_1$, tv'$_1$) can be considered redundant and consequently be ignored. The A* derivative makes use of this by pruning its Open list after the first entry with heur>0.

Figure 2:
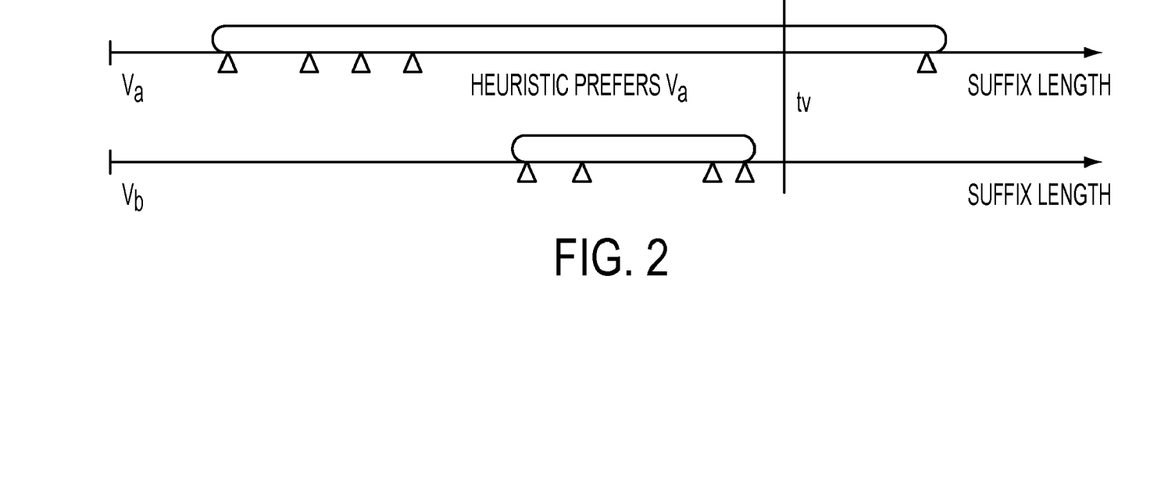
FIG. 2 is an illustration of a single-interval heuristic.

The foregoing approach advantageously offers guidance to a target value search through the use of a pattern database and a heuristic, whereby the foregoing approach offers better run time than the unguided approach (i.e., traversing through each path of connection graph C). However, notwithstanding the improvement, the foregoing approach is limited by the use of a single range for each vertex. Namely, the coarse nature of the pattern limits the effectiveness of the heuristic. Consider the example depicted in FIG. 2. The triangles represent the lengths of the different paths from vertex $v_a$, and respectively vertex $v_b$, to the goal vertex $v_g$ (i.e., different suffix lengths). The vertical marker is the target-value for the completion and the bars adjoining the top of the triangles represent the min-max intervals (i.e., the ranges) of all possible suffixes. Here the heuristic prefers the prefix ending in vertex $v_a$ because it is possible that there is a path somewhere in this interval that has a length exactly equal to the target value. From an omniscient view point, one can see that there are no paths in the suffixes of vertex $v_a$ that are even close to the target value. Accordingly, the search should have chosen vertex $v_b$ which has a path that is close to target value tv.

Figure 3:
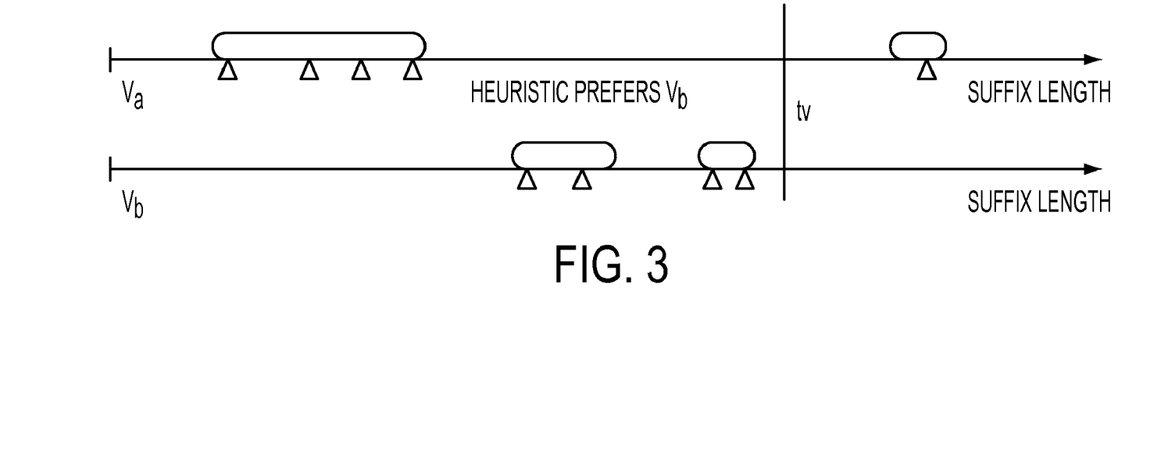
FIG. 3 is an illustration of a multi-interval heuristic.

To avoid the likelihood of this occurrence, an enhanced version of tvs is disclosed which allows path lengths to be approximated by a set of ranges. Consider the example depicted in FIG. 3, which depicts the same scenario shown in FIG. 2, except with multiple intervals. Here the heuristic correctly prefers the prefix ending in vertex $v_b$ because of the increased resolution offered by multiple intervals. Namely, in contrast to FIG. 2, the target value does not fall within either interval of vertex $v_a$ or either interval of vertex $v_b$. Accordingly, the best completion of both prefixes is known, whereby the prefix ending in vertex $v_b$ is preferred.

Figure 4:
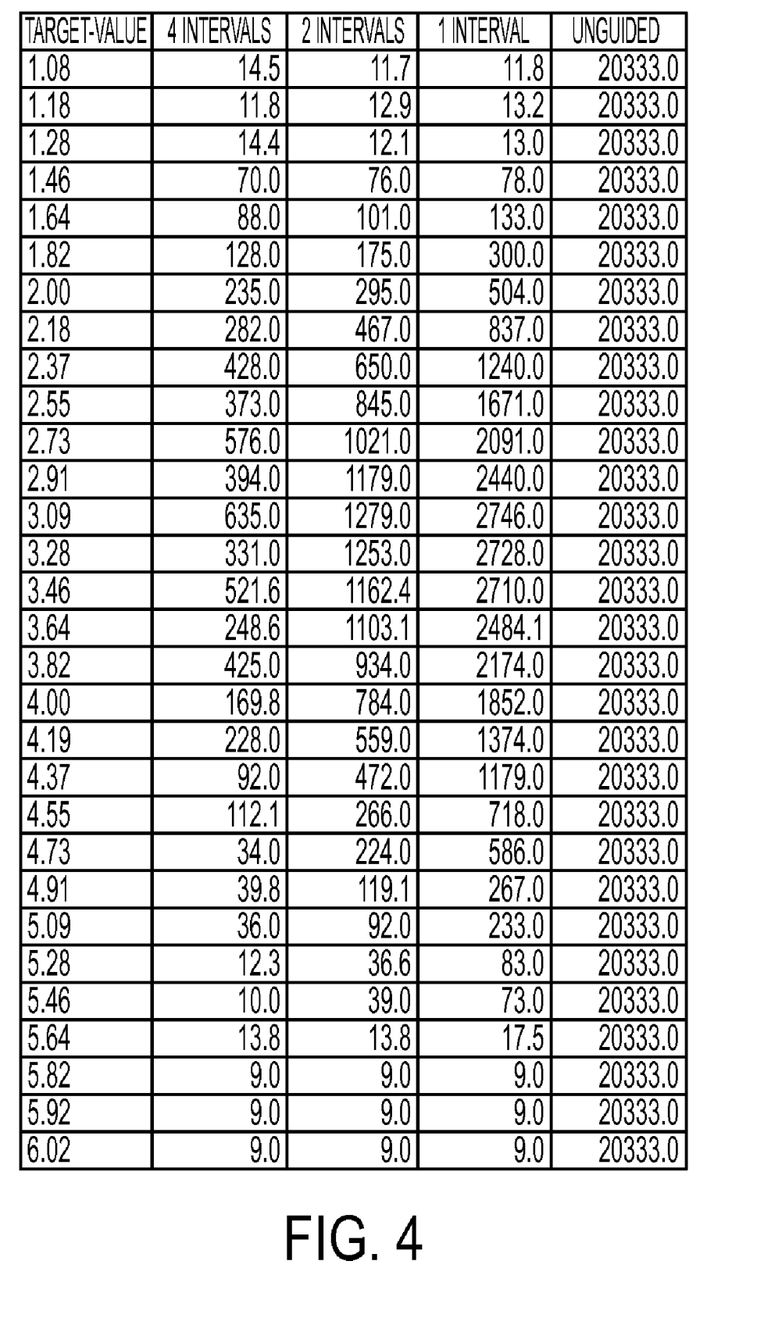
FIG. 4 is a table illustrating the number of expansions required by different heuristics.
Figure 5:
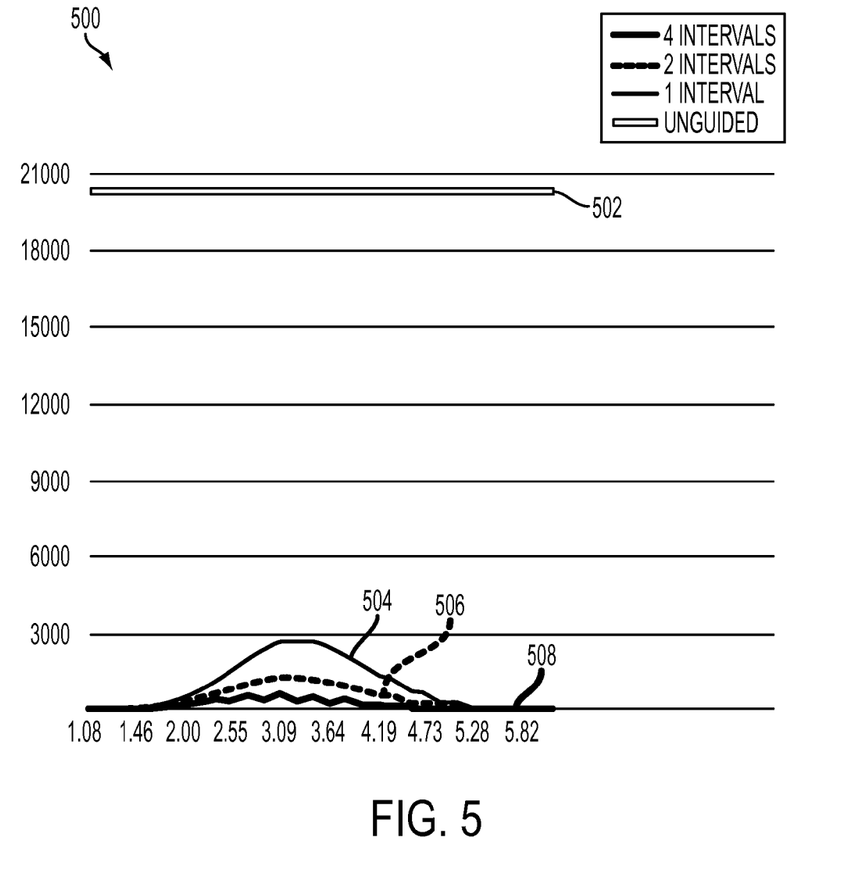
FIG. 5 is a graphical representation of the table of FIG. 4.

With reference to FIG. 4, a table illustrating the number of expansions performed by an exhaustive target value search and heuristic based target value searches are shown. FIG. 5 shows a graphical representation 500 of the table in FIG. 4. Obviously, the fewer expansions there are the better., An unguided search 502 shows the worst case situation in which every path between the initial vertex and the goal vertex is explored. This is analogous to a heuristic based target value search with zero intervals. Proceeding from 1 interval to 4 intervals (i.e., 504, 506 and 508), the number of node expansions clearly decreases, whereby it should be apparent that a multi-interval heuristic generally improves upon a single-interval heuristic.

Referring now to FIGS. 6-10, several embodiments or implementations of the present disclosure are hereinafter described in conjunction with the drawings, wherein like reference numerals are used to refer to like elements throughout, and wherein the various features, structures, and graphical renderings are not necessarily drawn to scale.

Figure 6:
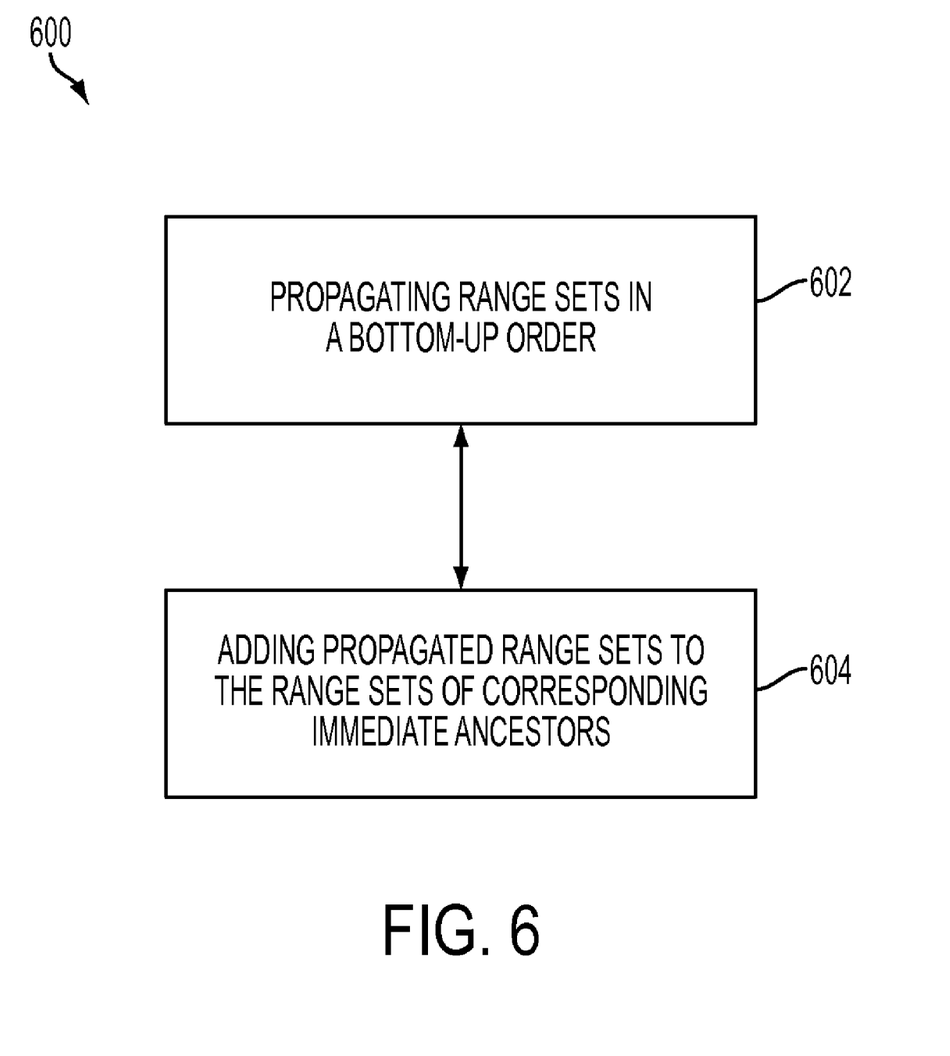
FIG. 6 is an exemplary method of building a multi-interval pattern database.
Figure 7:
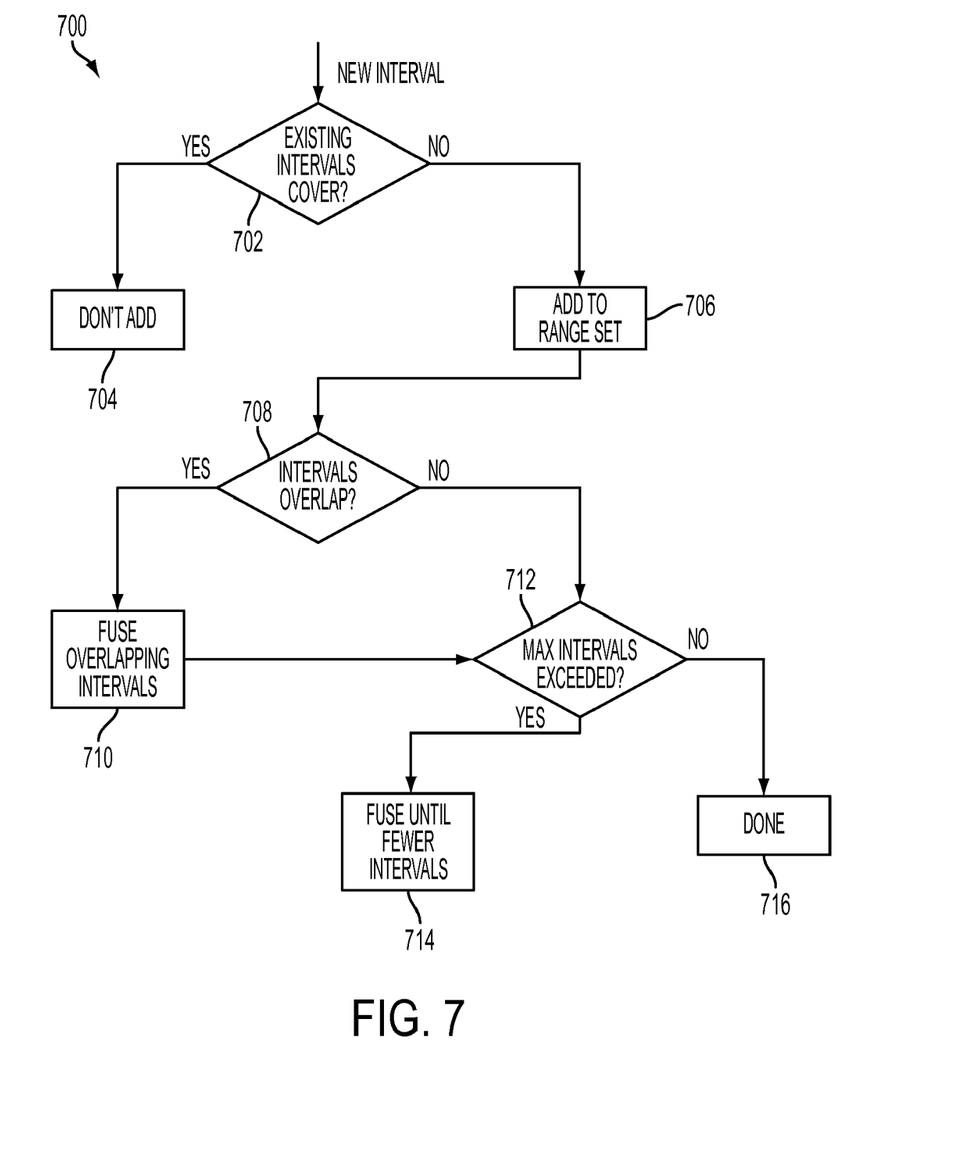
FIG. 7 is an exemplary embodiment of the logic necessary to add a range set to an existing range set.

Referring to FIGS. 6-7, application of multiple intervals to the creation of a multi-interval pattern databases will be discussed. FIG. 6 illustrates the exemplary method of creating a multi-interval pattern database. The method 600 for generating a multi-interval pattern database includes the steps of: propagating range sets in a bottom-up order (Step 602); and adding the propagated range sets to the range sets of corresponding ancestors (Step 604). FIG. 7 illustrates the exemplary logic 700 used for adding the propagated range sets to the range sets of the corresponding ancestors.

The method 600 of FIG. 6 propagates the range sets of the vertices in the connection graph using bottom-up hierarchical agglomeration scheme (Step 602). That is to say, starting from the bottom of the connection graph, i.e., the goal vertex, the range sets of the vertices forming the connection graph are propagated up towards the top of the graph, i.e., the initial vertex. Range sets are simply sets of one or more intervals, where an intervals includes a lower bound and an upper bound. Preferably, at least one of the propagated range sets is comprised of at least one interval. Range sets are propagated bottom-up because of the logical interdependence between a vertex and descendants of the vertex. Namely, the suffix lengths of a vertex are simply the suffix lengths of descendants shifted by the edge weight of the corresponding edges connecting the vertex and the descendants.

Each propagated range set is propagated from a source vertex to an immediate ancestor of the source vertex, where each propagated range set is propagated over the edge connecting the source vertex with the immediate ancestor. As should be appreciated, this edge is an in-edge of the source vertex, or an out-edge of the immediate ancestor. Each propagated range set is further derived from the range set of the source vertex. Namely, the propagated range set is the range set of the source vertex shifted by the edge weight of the edge connecting the source vertex with the immediate ancestor. Shifting simply entails adding the edge weight to each interval of a range set. For example, suppose the source vertex has a range set as follows: {[1, 3]; [5, 5]; [6, 9]}. Further suppose the source vertex has an in-edge with an edge weight of 2 connecting it with an immediate ancestor. The propagated range set for the immediate ancestor would be {[3, 5]; [7, 7]; [8, 11]}. An interval follows the format of [x,y], where x corresponds to the lower bound of the interval and y corresponds to the upper bound.

After a range set is propagated to an ancestor (Step 602), the propagated range set is added to the range set of the ancestor (Step 604) according to the exemplary logic shown in FIG. 7. The first step to adding a new interval to an existing range set is to check whether the intervals of the existing range set completely covers (or encompasses) the new interval (Step 702). Obviously, if the existing intervals already cover the new interval there is no reason to add the new interval (Step 704). However, if the existing intervals do not completely cover the new interval, the new interval is added to the existing range set (Step 706).

At this point, the following steps may depend on the maximum number of intervals allowed for a single range set. A user defined constant preferably defines the maximum number of intervals for a single range set. The selection of the constant should balance the interests of space and pre-computation complexity with the interests of accuracy and online computational effort. Naturally, using a large number of intervals requires a space and pre-computation complexity that is higher than a small number of intervals. However, on the flip side, a large number of intervals has an improved accuracy and reduces online computational effort. Notwithstanding the competing interests, if the maximum number of intervals allowed is infinite, each interval will simply corresponds to a single suffix length. As such, the only action that need be taken when adding a new interval to a range set is to remove duplicates. Herein, that has already been performed in Step 702, so no further action need be taken. Alternatively, if the maximum number of intervals is finite, additional checks are necessary as shown in FIG. 7. It should, however, be appreciated that no distinction need be drawn between an unlimited number of steps and a finite number of steps. Namely, although the proceeding steps are not necessary for an infinite number of intervals, the proceeding steps may nonetheless be carried out for an infinite number of intervals. The more compact representation may prove more beneficial than the little added information gained from additional checks. Thus, in one embodiment step 708 is performed for an infinite number of intervals. Preferably, a finite number of intervals are used.

Assuming a finite number of intervals (and optionally an infinite number of intervals), it is necessary to determine whether there are any overlapping intervals (Step 708). If such intervals exist, the intervals are fused together (Step 710). Fusing intervals simply entails merging the intervals into one interval comprising the minimum lower bound of the intervals and the maximum upper bound of the intervals. After overlapping intervals are fused and/or if there are no overlapping intervals, a determination is made as to whether the number of intervals exceeds the maximum number of intervals allowed (Step 712). If the number of intervals for the range set exceeds the maximum number of allowed intervals, the closest intervals are fused until the number of intervals equals to the maximum number of intervals (Step 714). However, if the number of intervals is less than or equal to the user defined constant, no further action is necessary (Step 716).

Referring back to FIG. 6, it should be apparent that the steps of propagating (Step 602) and adding the propagated range sets (Step 604) are not discretely sequential. That is to say, all the range sets cannot be propagated, and then added. Rather, because of the interdependence mentioned above, propagated range sets need to be added (Step 604) while the range sets are propagating bottom-up (Step 602).

Pseudo code for one specific implementation of the exemplary method 600 of FIG. 6 is shown below. The implementation begins by calling the computeEstimates algorithm. This algorithm processes vertices in LIFO order, whereby estimates are propagated to predecessors until a stable state is reached. The algorithm begins with a queue containing the goal vertex initialized with a range set comprising a single interval: [0, 0]. While there are vertices in the queue, the first vertex (or node) n is removed from the queue and a set of predecessors in the graph for the vertex n is determined. Then, len is determined for each predecessor p, and all of n's intervals are right-shifted by ten and added to p. len is the edge weight of the edge connection p to n. If p changes in the process, it is added to the queue.

The algorithm for adding an interval to a vertex, shown in the addInterval algorithm, begins by checking whether the new interval is enclosed by any of the vertex's intervals. If not, the new interval is added to the vertex, and the vertex is flagged as changed. Thereafter, the fuseIntervals algorithm is called until there is no intersection between intervals and the number of intervals is below a user defined constant. This function fuses (any of) the vertex's two closest intervals. Distance of intersecting intervals is defined as zero. Otherwise, distance is defined as the distance between the closest ranges.

```
Algorithm: computeEstimates

Result: computes-suffix-length estimates for each node in a
        connection lattice
 1 begin
 2   n, p: node
 3   len: link lengh;
 4   q: queue of nodes;
 5   pre: set of nodes;
 6   int: interval;
 7   int: = [0; 0]:
 8   addInterval(g, < int > );
 9   push (q, g);
10   while hasNodes(q) do
11      n: = first (q);
12      pre: = predecessors(n);
13      for in pre do
14         L addInterval(p, int >> len);
15         if changed(p) then
16            push(q, p);
17            L setNotChanged(p);
18 end
19
```

```
Algorithm: addInterval

Data: n: node, int: interval:

Result: incorporates an interval into a node's interval-list
 1 begin
 2    if nodeIntervalsCover (n, int) then
 3       L return:
 4    addToIntervalList (n, int);
 5    while intervalsIntersect(n) || intervalCount(n) > MAX-Int do
 6       L fuseIntervals(n);
 7    setChanged(n);
 8 end
```

```
Algorithm: fuseIntervals

Data: n: node

Result: fuses the two closest intervals in n's intervals list
 1 begin
 2    a, b, c,: interval;
 3    closestIntervals(n, a, b);
 4    c. lower: = min(a. lower, b. lower);
 5    c. upper: = max(a. upper, b. upper);
 6    removeFromIntervalList(p, a);
 7    removeFromIntervalList(p, b);
 8    addToIntervalList (n, c);
 9 end
```

In view of the forgoing discussion, it should be apparent how to create a multiple interval pattern database. Additionally, it should also be appreciated that the foregoing discussion of generating a pattern database may be used to propagate intervals for any directed acyclic, not just connection graph, and notwithstanding the specific implementation described above, alternative implementations for generating a multi-interval pattern database may be employed.

Figure 8:
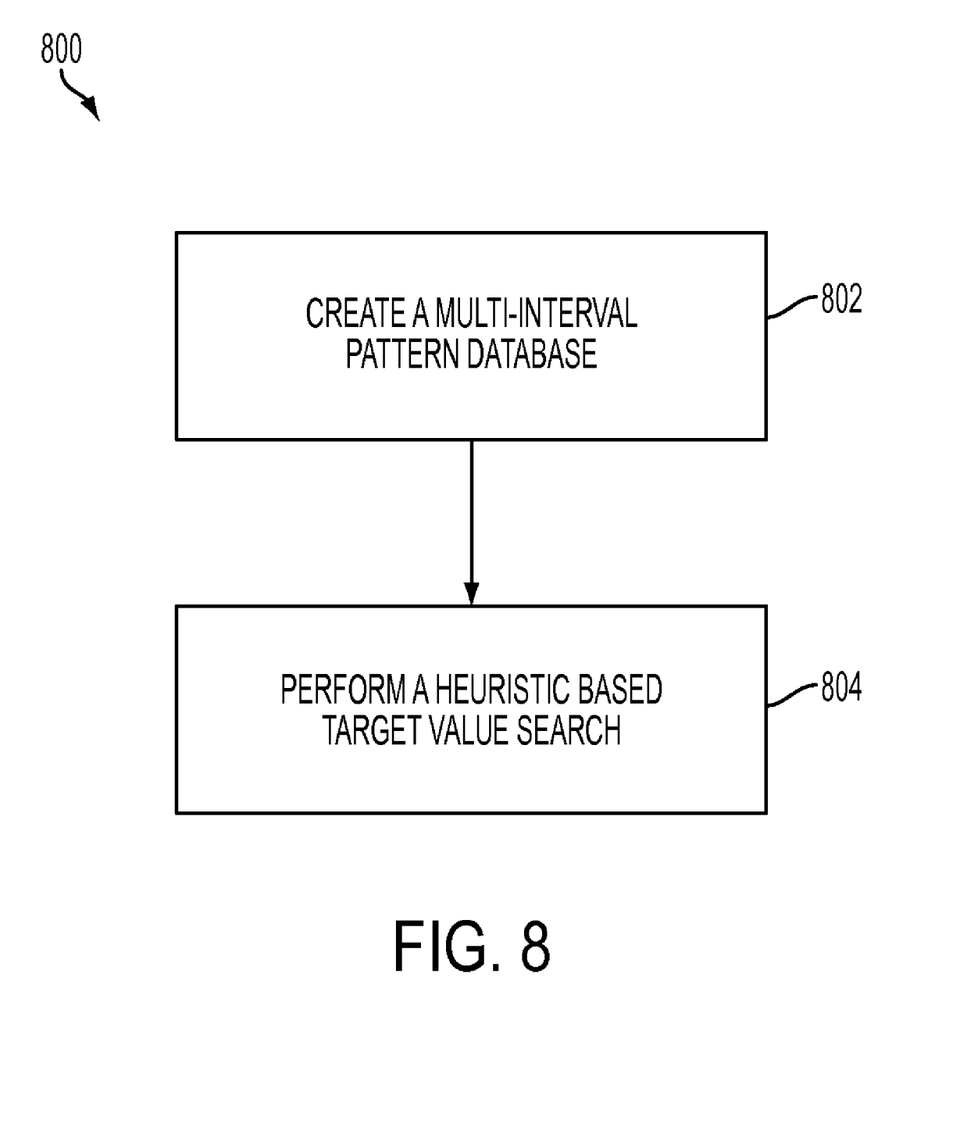
FIG. 8 is an exemplary method of performing a multi-interval heuristic based target value search.

Referring to FIG. 8, application of multiple intervals to heuristic based target value searching is discussed. FIG. 8 illustrates the exemplary method of performing a multi-interval heuristic based target value search. The method 800 operates on a connection graph. The method 800 for performing a multi-interval heuristic based target value search includes the step of performing a heuristic based target value search (Step 804). The exemplary method optionally includes the step of creating a multi interval pattern database (Step 802).

The method 800 optionally begins by creating a multi-interval pattern database for the connection graph between the initial vertex and the goal vertex (Step 802). If the pattern database already exists, it is unnecessary to recreate the pattern database. As one should appreciate, the pattern database only needs to be recreated if the goal vertex changes or the initial vertex does not fall within the existing pattern database. This follows because a pattern database for a connection graph beginning at an initial vertex and ending at a goal vertex encompasses all connection graphs beginning at a vertex within the connection graph and ending at the goal vertex. Regardless of whether the pattern database already exists, the pattern database must be created some time before the search of step 804 is performed. The pattern database may be created in any number of ways, including, but not limited to, the implementation described above.

Once the pattern database exists (Step 802), a heuristic based target value search is performed (Step 804). While performing the heuristic based target value search, the search algorithm preferably maintains a current search prefix. The current search prefix is the path extending from the initial vertex to a lead vertex. The lead vertex is the vertex the search is currently processing. As should be appreciated, the lead vertex is the descendant of all of the other vertices in the current search prefix.

At each lead vertex which is being processed, the search preferably checks to see if a perfect solution has been found. Namely, the search checks to see if the path length of the current search prefix is equal to the target value, and whether the lead vertex is the goal vertex. If a perfect solution is found, the search preferably ends and returns the current search prefix. However, under different embodiments the search may save the current search prefix and continue to find any other perfect solutions.

Assuming a perfect solution has not been found, the depth-first search determines a heuristic value for the lead vertex of a prefix p according to the following equation:

$$heur(p) = \begin{cases} 0 & \text{if } \exists i: l_i \leq tv' \leq u_i \\ \min(|r \cdot lb - tv'|, |r \cdot ub - tv'|) & \text{otherwise} \end{cases}$$

The heuristic compares the target value to go tv' with the range set for the lead vertex of the prefix p. A range set include one or more intervals i, wherein an interval i includes a lower bound $l_i$ and an upper bound $u_i$. By way of this comparison, the heuristic returns the minimum deviation of the target value to go tv' from the closest interval i. The target value to go ti' is simply the target value minus the path length of the current search prefix p. The range set, as described above, is stored in the pattern database and provides the lower $l_i$ and upper $u_i$ bounds on intervals of path lengths extending from the lead vertex to the goal vertex. A path length extending from the lead vertex to the goal vertex is hereinafter referred to as a suffix. Thus, the target value to go tv' corresponds to a perfect suffix length and the intervals i of the range set provide the ranges of actual suffix lengths. As should be apparent, a prefix and a suffix together define a path from the initial vertex to the goal vertex.

If the target value to go tv' falls inside any of the intervals i, the heuristic returns a minimum deviation of zero, because there could be a suffix with a path length equal to the target value to go tv'. That is to say, there could be a perfect solution. However, other than the possibility of there being a solution, no guidance is given. If the target value to go tv' falls outside all of the intervals i, there are no suffixes that can lead to a perfect solution. Accordingly, the heuristic returns the minimum deviation of the target value to go from the closest interval i of the lead vertex. This minimum deviation allows a determination of the best possible path length with the current search prefix. That is to say, the path length of the current search prefix can at best have a path length equal to the target value plus or minus the minimum deviation.

Once the heuristic value has been determined, the heuristic based target value search may continue traversing the connection graph in at least two ways. First, if a heuristic value of zero is returned, there may be a suffix offering a perfect solution, but it is unknown. Accordingly, the search continues to traverse the connection graph along the current search prefix and explores the corresponding suffixes. Second, if a positive heuristic value is returned, there is no need to explore the suffixes of the current search prefix, because there is no suffix offering a perfect solution. However, there may not be a perfect solution elsewhere within the connection graph, so the current search prefix may still be the best prefix. Accordingly, the heuristic value of the current search prefix is compared with that of previous current search prefixes. If the current search prefix is less than previous current search prefixes, the current search prefix should be saved because it offers a better solution than the previous current search prefixes.

One specific implementation making use of the foregoing steps is embodied in the following pseudo code. As shown below, the targetValueSearch algorithm carries out the A* approach to target-value search. Therein, computeBounds is called for each prefix to determine the heuristic value according to the foregoing multi-interval heuristic. computeBounds also returns an upper bound on path lengths $d_u$ according to the following equation:

$$d_u = \min(\min_{l_i \geq t_{pre}} t_{pre} - l_i, \min_{u_i \geq t_{pre}} u_i - t_{pre})$$

Algorithm: targetValueSearch

Data: t : targetValue

Result: computes a target-value-path between start and goal node

```
1  begin
2     globalMax, t_pf, t'_pf, d_l, d_u: float:
3     q: priority queue, sorted in asc. order;
4     s: node pf. pf': prefix 5     pf: = < s >:
6     [d_l: d_u]: = computeBounds(pf', t'_pf);
7     push(q.(pf,t), d_l):
8     globalMax: = d_u;

9
10    while hasNodes (q) do
11       (pf,t_pf): = pop(q);
12       if pf.last = = goal then
13          return pf;
14
15       for s in successors(pf,last) do
16          pf': = pf • s;
17          t'_pf: = t_pf - linkLength(pf,last, s);
18          [d_l: d_u]: = computeBounds(pf', t'_pf);
19          globalMax: = min(globalMax. d_u);
          if d_l < globalMax then
20             push(q,(pf',t'_pf),d_l):
21 end
   return fail;
```

Figure 9:
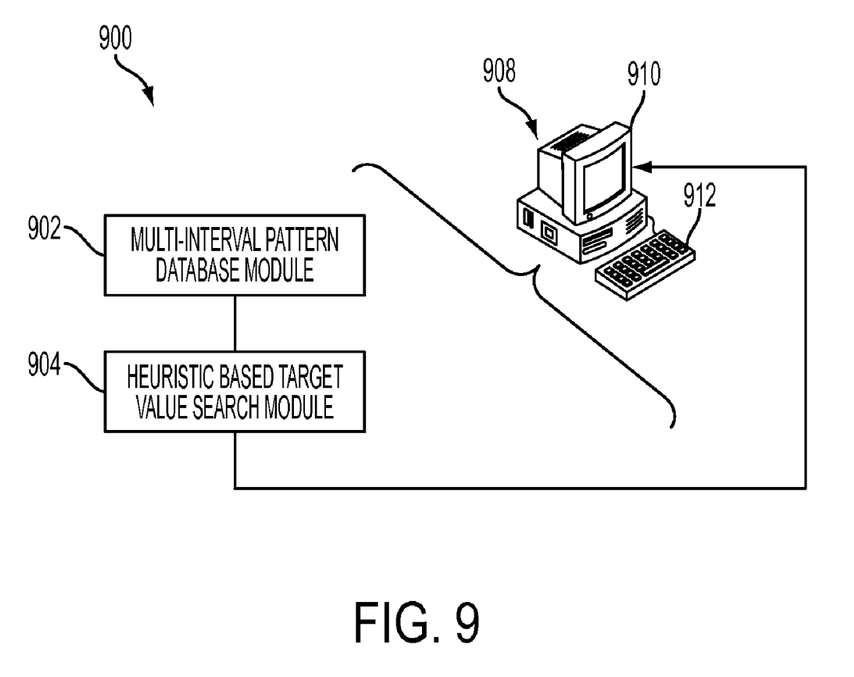
FIG. 9 is a multi-interval heuristic based target value search engine (MHTVS) employing the exemplary multi-interval heuristic based target value search of present application.

Now that the multi-interval heuristic based target value search of the present application has been discussed, its application to systems such as a multi-interval heuristic based target value search engine and a model-based control system will be discussed. With reference to FIG. 9, a multi-interval heuristic based target value search (MHTVS) engine 900 is described. The MHTVS engine 900 is suitably embodied by a computer 908, or other digital processing device including a digital processor, such as a microprocessor, microcontroller, graphic processing unit (GPU), etc. and storage. In other embodiments, the MHTVS engine 1000 may be embodied by a server including a digital processor and including or having access to digital data storage, such server being suitably accessed via the Internet or a local area network, or by a personal data assistant (PDA) including a digital processor and digital data storage, or so forth. The computer or other digital processing device suitably includes or is operatively connected with one or more user input devices such as an illustrated keyboard 912 for receiving user input to control the MHTVS engine 900, and further includes or is operatively connected with one or more display devices such as an illustrated display 910 for displaying output generated based on the output of the MHTVS engine 900. In other embodiments, the input for controlling the MHTVS engine 900 is received from another program running previously to or concurrently with the MHTVS engine 900 on the computer 908, or from a network connection, or so forth. Similarly, in other embodiments the output may serve as input to another program running subsequent to or concurrently with the MHTVS engine 900 on the computer, or may be transmitted via a network connection, or so forth.

The MHTVS engine 900 includes a multi-interval pattern database module 902 and a heuristic based target value search module 904. The multi-interval pattern database module 902 receives a connection graph from a source external to the MHTVS engine 900, and generates a multi-interval pattern database for the connection graph. The multi-interval pattern database is preferable carried out according to the above discussion of generating a multi-interval pattern database. The heuristic based target value search module 904 receives the multi-interval pattern database and the connection graph from the multi-interval pattern database module 902. The heuristic based target value search module 904 further receives a target value from a source external to the MHTVS engine 900, such as the keyboard 912. The heuristic based target value search module 904 uses the received target-value, multi-interval pattern database and connection graph to find a target path within the connection graph which has a path length most closely approximating the target value. The heuristic based target value search module searches for the target path using the multi-interval heuristic discussed above. Thereafter, the target path is output for display, printout and/or implementation into additional decision making mechanisms, such as planners.

In some embodiments, the exemplary methods, discussed above, the MHTVS engines employing the same, and so forth, of the present invention are embodied by a storage medium storing instructions executable (for example, by a digital processor) to implement the depth first target value search. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

Figure 10:
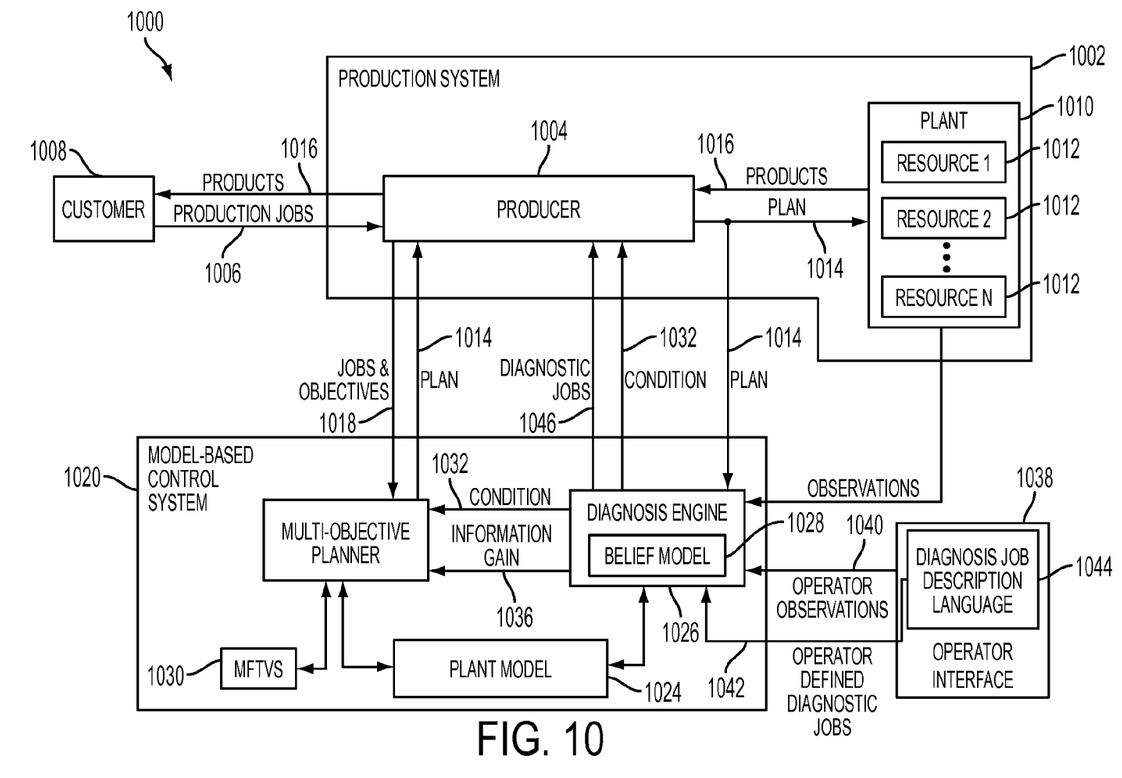
FIG. 10 is a schematic diagram illustrating a production system, an operative interface, and a model-based control system with a planner, a plant model, a diagnosis engine, and a MHTVS engine.

Turning to FIG. 10, the MHTVS engine is employed by a system 1000. The system 1000 includes a production system 1002 having a producer component 1004 that receives production jobs 1006 from customer 1008. The resources may be, but need not be, machines, software or logic components, objects, etc. The production system further includes a plant 1010 having a plurality of resources 1012 that may be selectively actuated or operated according to one or more plans 1014, so as to produce one or more products 1016 for provision to the customer 1008. Plans 1014 are comprised of a series of actions to achieve one or more production goals. The producer 1004 provides jobs and objectives 1018 to a multi-objective planner 1022 of model-based control system 1020, and production system 1002 receives plans 1014 from planner 1022 for execution in the plant 1010. The plans 1014 can include one or both of production and diagnostic goals.

As shown in FIG. 10, control system 1020 further includes a plant model 1024 of the plant 1010, a diagnosis engine 1026 with a belief model 1028 and a multi-interval heuristic based target value search (MHTVS) engine 1030. The diagnosis engine 1026 determines and updates a current plant condition 1032 based on one or more previously executed plans 1014, corresponding observations 1034 from the plant 1010, and the model 1024. The diagnosis engine 1026 also provides expected information gain data 1036 to the planner 1022 for one or more possible plans 1014 based on observations 1034 and the plant model 1024. The MHTVS engine 1030 implements the exemplary multi-interval heuristic based target value search of the present invention and aids the multi-objective planner in constructing plans which facilitate pervasive diagnosis.

The primary objective of pervasive diagnosis is to use the diagnosis engine's beliefs to influence plans to gain additional information about the condition of the plant 1010. A plan is informative if it contributes information to the diagnosis engine's beliefs, and the plan outcome has a reasonable amount of uncertainty. The model-based control system 1020 facilitates pervasive diagnosis with the selective employment of intelligent on-line diagnosis through construction and execution of plans that provide enhanced diagnostic information according to the plant condition 1032 and/or the expected information gain 1036. The model-based control system 1020 may further facilitate pervasive diagnosis with the generation of one or more dedicated diagnostic plans for execution in the plant 1010 based on at least one diagnostic objective and the plant condition 1032. Thus, the model-based control system 1020 seeks to find a plan that achieves production goals and diagnostic goals.

The embodiment of FIG. 10 also includes an operator interface 1038 implemented in the form of a computer or other platform(s). Operator interface 1038 is operatively coupled with diagnosis engine 1026 to provide operator observations 1040 to the diagnosis engine 1026, with the diagnosis engine 1026 determining the current plant condition 1032 based at least partially on the operator observations 1040 in certain implementations. Moreover, the exemplary operator interface 1038 allows the operator to define a diagnostic job 1042 using a diagnosis job description language 1044, and the diagnosis engine 1026 may provide diagnostic jobs 1046 to the producer 1004. The diagnosis engine 1026 in this implementation is operative to selectively provide one or more self-generated diagnostic jobs 1046 and/or operator defined diagnostic jobs 1042 to the producer 1004, which in turn provides jobs and objectives 1018 to the planner 1022.

Referring back to the MHTVS engine 1030, the engine 1030 returns a plan operative to produce an optimal amount of diagnostic information to the planner 1022. In doing this, the engine 1030 maps a pervasive diagnosis problem to a target value problem. Thereafter, the MHTVS engine 1030 uses the exemplary multi-interval heuristic based target value search of the present application to solve the following equation and produce a plan with an optimal amount of uncertainty.

$$p^{opt} = \mathrm{argmin}_{achievesGoal(p) \in P} |Pr(ab(p)) - T|$$

As should be apparent, $p^{opt}$ corresponds to an optimal plan. Additionally, $Pr(ab(p))$ is the failure probability of plan p, and T is the optimal uncertainty. P is a set of plans that achieves the goals for the optimal plan $p^{opt}$. As should appreciated, a plan with an optimal amount of uncertainty is a plan that produces an optimal amount of information.

To map a pervasive diagnosis problem to a target value problem, a graph and a connection graph, derived from the graph, is constructed. The vertices of the graph correspond to system states and the edges of the graph correspond to actions. A plan corresponds to a plurality of actions. Additionally, the edge weights correspond to the failure probability of the corresponding edge (or action), and the optimal amount of uncertainty corresponds to the target value.

It is to be appreciated that in connection with the particular exemplary embodiments presented herein certain structural and/or functional features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

What is claimed is:

1. A method for determining a target path for a model-based control system which employs target value searching, wherein said model-based control system includes a directed acyclic graph, wherein the directed acyclic graph includes a plurality of vertices interconnected by a plurality of edges, wherein each of the plurality of vertices includes a range set, said method comprising the steps of:
  (1) generating, using an electronic processor, a multi-interval pattern database for the model-based control system including:
    (a) propagating the range sets of each of the plurality of vertices in a bottom-up order, wherein each of the propagated range sets is propagated from a source vertex to an immediate ancestor over an edge, wherein the range set of at least one of the plurality of vertices includes a plurality of intervals; and
    (b) adding the each of the propagated range sets to the range set of the immediate ancestor corresponding to the each of the propagated range sets, and fusing intervals of the each of the propagated range sets with intervals of the range set of the immediate ancestor corresponding to the each of the propagated range sets until a number of the intervals of the range set of the immediate ancestor corresponding to the each of the propagated range sets is within a maximum number of intervals, and
  (2) performing, using an electronic processor, a heuristic based target value search of the directed acyclic graph for determining the target path, wherein the heuristic based target value search uses a multi-interval heuristic to prune search space, and wherein the multi-interval heuristic uses the multi-interval pattern database to compare a prefix's target value against a prefix's last vertex's range, the prefix representing a path from an initial vertex to another vertex in the directed acyclic graph.

2. The method of claim 1, wherein the each of the propagated range sets is shifted by an edge weight of the edge corresponding to the each of the propagated range sets.

3. The method of claim 1, wherein the bottom-up order uses a hierarchical agglomeration scheme.

4. The method of claim 1, wherein the fusing intervals of the each of the propagated range sets includes overlapping intervals of the range set of the immediate ancestor corresponding to the each of the propagated range sets.

5. The method of claim 1, wherein the maximum number of intervals is a user defined constant.

6. The method of claim 1, wherein the intervals fused together are intervals with closest intervals to each other.

7. The method of claim 1, wherein said plurality of vertices include the initial vertex, a goal vertex, and one or more intermediate vertices, wherein said one or more intermediate vertices are both descendants of the initial vertex and ancestors of the goal vertex.

8. The method of claim 7, wherein the bottom-up order begins at the goal vertex.

9. The method of claim 1, wherein the target value search terminates upon finding a perfect target path.

10. The method of claim 1, wherein the target value search searches at least one prefix, wherein at least one of the at least one prefix includes a range set comprised of at least two intervals.

11. The method of claim 1, wherein a current search prefix includes one or more intervals and a target value to go which falls outside each of the one or more intervals, wherein the multi-interval heuristic returns a minimum deviation of the target value to go from a closest interval of the one or more intervals.

12. The method of claim 1, wherein a current search prefix includes one or more intervals and a target value to go which falls within one of the one or more intervals, wherein the multi-interval heuristic returns zero.

13. A model-based control system for controlling a production system, wherein said production system comprises a plant and provides jobs and objectives to the model-based control system, the model-based control system including a directed acyclic graph, the directed acyclic graph including a plurality of vertices interconnected by a plurality of edges, said model based control system comprising:
  a processor based planner operative to provide the production system with a plan, wherein said processor based planner generates the plan using a heuristic based target value search, wherein the heuristic based target value search uses a multi-interval heuristic, and generates the plan with a failure probability most closely approximating a target value, the heuristic based target value search including:
    (1) a multi-interval pattern database for the model-based control system, the multi-interval pattern database including:
      (a) propagated range sets of each of a plurality of vertices, wherein each of the propagated range sets is propagated from a source vertex to an immediate ancestor over an edge, wherein the range set of at least one of the plurality of vertices includes a plurality of intervals; and (b) each of the propagated range sets added to the range set of the immediate ancestor corresponds to the each of the propagated range sets, and each of the propagated range sets have fused intervals with intervals of the range set of the immediate ancestor corresponding to the each of the propagated range sets until a number of the intervals of the range set of the immediate ancestor corresponding to the each of the propagated range sets is within a maximum number of intervals, and (2) a heuristic based target value search of the directed acyclic graph configured to determine the target path, wherein the heuristic based target value search uses the multi-interval heuristic to prune search space, and the multi-interval heuristic uses the multi-interval pattern database to compare a prefix's target value against a prefix's last vertex's range, the prefix representing a path from an initial vertex to another vertex in the directed acyclic graph;

a system model operative to model the behavior of the plant, wherein the system model is a model-based control system operable with the heuristic based target value search; and, a diagnosis engine operative to estimate failure probabilities for plans and provide diagnostic guidance to the planner.

14. The model-based control system of claim 13, wherein the heuristic based target value corresponds to an optimal amount of uncertainty in a plan outcome.

* * * * *